Aug. 24, 1954  G. A. HIGHBERG ET AL  2,687,308
CHUCK JAW ADJUSTING DEVICE
Filed Jan. 5, 1952  2 Sheets-Sheet 1
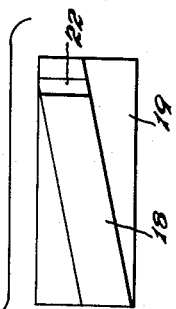
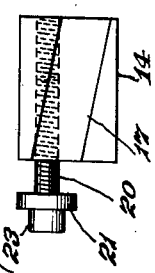
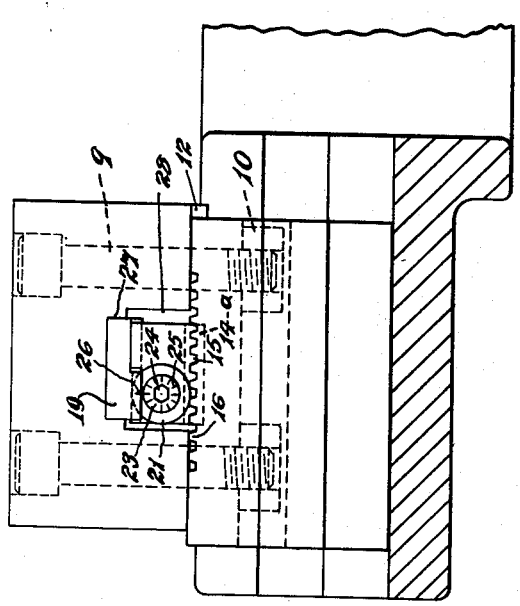
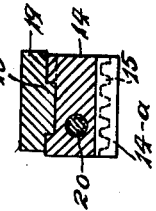
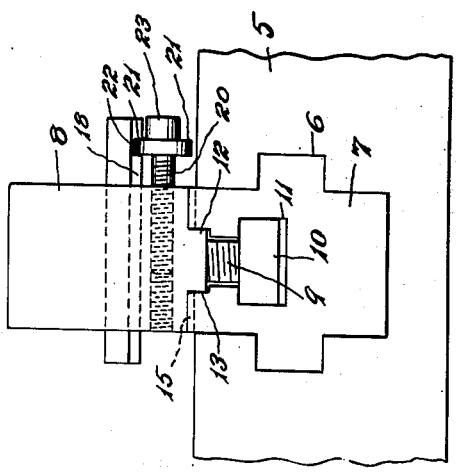
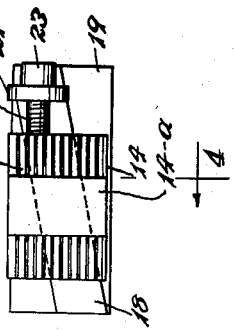
INVENTORS.
GEORGE A. HIGHBERG.
LEONARD C. PONTING
BY Louis V. Lucia
ATTORNEY.

Aug. 24, 1954 G. A. HIGHBERG ET AL 2,687,308
CHUCK JAW ADJUSTING DEVICE
Filed Jan. 5, 1952 2 Sheets-Sheet 2

INVENTORS
GEORGE H. HIGHBERG &
LEONARD C. PONTING.
BY Roger B. McCormick
ATTORNEY Patented Aug. 24, 1954

2,687,308

UNITED STATES PATENT OFFICE 2,687,308

CHUCK JAW ADJUSTING DEVICE

George A. Highberg, West Hartford, Conn., and Leonard C. Ponting, Pawtucket, R. I., assignors to The Whiton Machine Company, New London, Conn., a corporation of Connecticut Application January 5, 1952, Serial No. 265,167

4 Claims. (Cl. 279—123)

1

This invention relates to an adjusting device for the jaws of a lathe chuck or the like. More specifically, the device is adapted to effect micrometer adjustments between the work-engaging top jaw and the master jaw which it is associated with on a chuck of the type having a plurality of the so-called master jaws which are simultaneously moved to and from work-engaging positions. In chucks of this type, the master jaws do not ordinarily engage the work, but each carries a top jaw for this purpose. There are many obvious advantages in having a top jaw adjustable with respect to its main jaw, as for example, the top jaws can be individually adjusted to assure simultaneous engagement with the workpiece when the master jaws are shifted to "work-engaging" positions.

It is an object of the present invention to provide a novel and improved device for adjusting the work-engaging top jaw of a chuck upon its respective master jaw.

It is a further object to provide such a device which is easy to use, simple in construction, and highly efficient for making accurate micrometer adjustments between the top and master jaws.

Further objects and advantages of this invention will be more clearly understood from the following description and from the accompanying drawings in which:

Fig. 1 is an end view of cooperating top and master jaws in a chuck and showing the use of my improved adjusting device.

Fig. 2 is a side view thereof.

Fig. 3 is a bottom view of the said adjusting device.

Fig. 4 is a transverse sectional view taken on line 4—4 of Fig. 3.

Fig. 5 is a view showing the opposed interengageable sides of the cooperating members of the said adjusting device.

Figure 6:
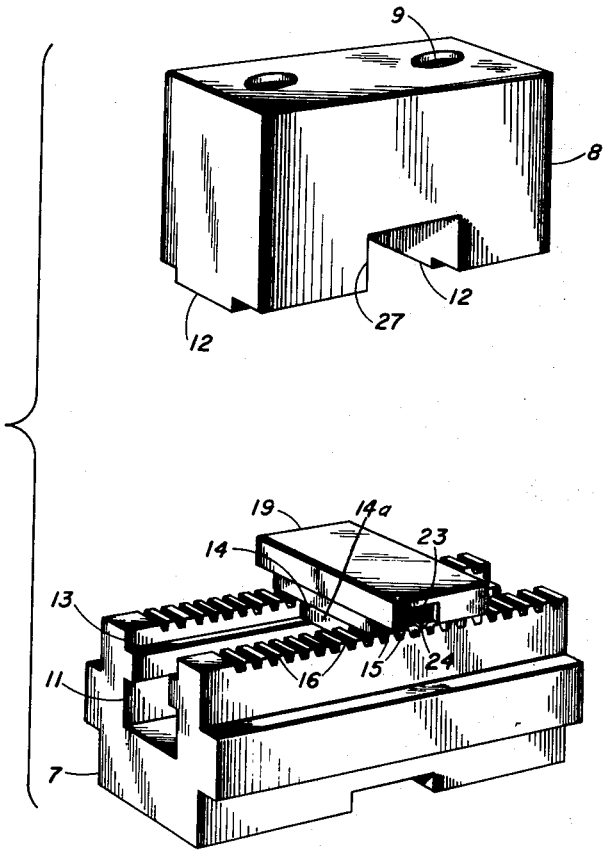
Fig. 6 is a perspective view of the top and master jaws showing the adjusting device in place on the master jaw and showing the top jaw in exploded relationship thereto.

As illustrated in the drawings, the numeral 5 denotes the body of a conventional chuck having a radial key slot 6 in which is slidably contained a master jaw 7 which is adapted for operation by conventional means (not shown) for selective reciprocable movement in the slot 6 to and from work-engaging positions.

A top jaw 8 is detachably secured upon the said master jaw by suitable clamping means such as clamping screws 9 which are threaded to clamping nuts 10 that are slidable in the head portion of a centrally disposed inverted T-shaped slot 11 which extends longitudinally in the master jaw.

To permit guided longitudinal adjustment of the top jaw 8 relative to the master jaw 7 when the clamping bolts and nuts have been loosened and to prevent relative transverse movement of the jaws, a centrally disposed longitudinally extending projection or rib 12 is provided on the bottom face of the top jaw 8 for sliding engagement within a wide portion 13 of the stem of the inverted T-shaped slot 11, which portion opens upon the top face of the master jaw 7.

As thus far described, the construction of the top jaw and master jaw conforms to conventional practice. In further keeping with conventional practice, the master jaw 7 is of the serrated type, i. e., a plurality of transverse teeth 16 are provided in the top surface of the master jaw on each side of the longitudinally extending slot 11. Accordingly, the master jaw in its entirety may be identified as an "American Standard Master Jaw" of the serrated type which has transverse teeth normal to the longitudinal slot and on both sides thereof. It is conventional practice to provide complementary teeth on the top jaw or on a key supported in the top jaw so that the top jaw can be adjusted relative to the master jaw by selectively interengaging the teeth.

In accordance with the present invention, a two-piece key-like device is provided to adjustably interengage the top jaw and the master jaw. One piece or member of said adjusting device is identified by the reference numeral 14 and comprises a generally rectangular block having a series of longitudinally extending teeth 15 across each end of the bottom surface thereof, which teeth are adapted to selectively engage with the transverse teeth 16 in the top surface of the master jaw 7. Between the series of teeth 15 on each end of the block 14, the said block is provided with a downwardly extending projection or rib 14a adapted to slidably engage within the wide portion 13 in the longitudinal slot 11 in the master jaw. It will be seen that the projection or rib 14a prevents movement of the block 14 transversely of the master jaw and the teeth 15 and 16 prevent movement of the block 14 longitudinally of the master jaw after the said teeth have been selectively engaged. Accordingly, in further consideration of the adjusting device, the block 14 may be referred to as a "base member" which cannot be moved relative to the master jaw after the teeth have been selectively engaged.

The said base member 14 has a cam slot 17 extending generally diagonally across and in the direction of its greatest dimension in the top surface thereof. The said cam slot 17 receives a complementary projection or rib 18 on the bottom surface of the other piece or member 19 making up the adjusting device. As best shown in Fig. 5, the member 19 is also of generally rectangular configuration. When the member 19 is placed over the base member 14 with its diagonal rib 18 located within the cam slot 17 in the said base member, the two said members define the generally rectangular key-like adjusting device of the present invention. The said device is located between the master jaw 7 and the top jaw 8 with the member 19 slidably disposed in a transverse slot 27 in the top jaw and with the teeth 15 of the base member 14 selectively engaged with the teeth 16 on the master jaw. The body portion of the base member 14 is not disposed within the transverse slot 27 but is located in spaced relationship within a wide communicating slot 28 defined in the bottom face of the top jaw.

It will be readily understood that the member 19 can only move diagonally with respect to the base member 14 because of the interengaged rib and cam slot. Since the base member 14 is fixed with respect to the master jaw, because of selective engagement between their teeth, all relative movements between the members 14 and 19 are resolved in diagonal movement of the member 19 relative to the master jaw. The longitudinal component of diagonal movement of the member 19 takes place within the transverse slot 27 in the top jaw without causing transverse movement of the top jaw relative to the master jaw. The transverse component of the diagonal movement of the member 19 causes the top jaw to be moved longitudinally with respect to the master jaw. Such longitudinal movement of the top jaw relative to the master jaw can be in either direction, i. e., towards or away from the axis of the chuck body 5, depending, of course, upon the direction of diagonal movement of the member 19. Obviously, the top jaw 8 can be adjusted longitudinally of the master jaw 7 in micrometer increments by considerably greater diagonal movement of the member 19.

Such diagonal movement of the member 19 relative to the base member 14 and the master jaw 7 is effected by means of an adjusting screw 20 which is threaded into the base member 14 and extends longitudinally thereof. A flange 21 and head 23 having a tool receiving socket 24 are provided on one end of the screw 20 so as to be readily accessible from one side of the top jaw. A portion of the screw head flange 21 is received within a slot 22 (Fig. 5) provided adjacent one end of the member 19 and extending transversely thereof through the rib 18. As the screw 20 is turned by a suitable tool engaged within the socket 24 of the head 23 to either advance the screw into the base member 14 or to withdraw the same therefrom, the member 19 is moved diagonally with respect to the base member 14. Thus, rotation of the screw 20 to effect diagonal movement of the member 19 relative to the base member 14 and the master jaw 7 causes longitudinal adjustment of the top jaw 8 relative to the master jaw. Since the member 19 can be moved in either diagonal direction by the screw 20 depending upon the direction of rotation thereof, it will be seen that the top jaw can be moved in either longitudinal direction with respect to the master jaw or, in other words, the top jaw can thus be moved radially inwardly or outwardly of the chuck body 5.

The amount of top jaw movement caused by rotation of the screw 20 through one revolution can easily be determined and the results thereof utilized in calibrating the adjusting device for future reference. In this manner, the screw head 23 may be provided with a plurality of calibrations or graduations 25 corresponding to increments of top jaw movement and such graduations can be read with reference to an indicating mark 26 placed upon the end of the rib 18, as shown in Fig. 2.

The assembly and operation of the chuck jaw adjusting device will probably be apparent from the foregoing description, but it is believed that a brief review thereof will serve for a more complete understanding of the invention.

The members 14 and 19 of the adjusting device are preferably assembled as a unit with the screw 20 threaded into the member 14 and with the screw head flange 21 received within the transverse slot 22 in the member 19. The adjusting device can then be placed upon the master jaw in any desired position so that the teeth of the base member 14 interengage the nearest series of corresponding teeth 16 on the master jaw. The top jaw is then placed upon the master jaw and over the adjusting device so that the rib 12 on the top jaw is received within the wide portion 13 of the inverted T-shaped slot 11 on the master jaw. The bolts 9 are then threaded into the clamping nuts 10 disposed within the head portion of the inverted T-shaped slot, but the said bolts and nuts are not tightened. The adjusting device may then be operated by a suitable tool engaged within the socket 24 in the head of the screw 20 to effect diagonal movement of the member 19 relative to the base member 14 and master jaw to thereby effect the desired longitudinal adjustment of the top jaw relative to the master jaw. When the desired adjustment of the top jaw has been completed, the clamping bolts 9 are tightened in the nuts 10 and the top jaw will be securely clamped in its adjusted position upon the master jaw.

While the invention has been described with reference to one specific embodiment, it is not our intention to limit the scope of the invention to the described embodiment otherwise than indicated by the claims which follow.

We claim:

1. In a chuck, the combination comprising a master jaw having a longitudinally extending slot in its outer face and a plurality of transverse teeth adjacent said slot, a top jaw having a transverse slot and a longitudinally extending rib on its inner face which rib is engaged within said longitudinal slot to permit longitudinal adjustment between said jaws and to prevent relative transverse movement therebetween, and an adjusting device disposed between said jaws including a base member having at least one tooth selectively engaged with the teeth on said master jaw and having a projection engaged with said longitudinal slot to fix said base member relative to said master jaw in selected position, said adjusting device also including another member slidably engaged within said transverse slot and engaging said base member, cam means between said base member and said other member for effecting a longitudinal component of movement of said top jaw when said other member is moved within said transverse slot and relative to said base member, and manually operable means for moving said other member within said transverse slot.

2. In a chuck, the combination comprising a master jaw having a longitudinally extending slot in its outer face and a plurality of transverse teeth adjacent said slot, a top jaw having a transverse slot and a longitudinally extending rib on its inner face which rib is engaged within said longitudinal slot to permit longitudinal adjustment between said jaws and to prevent relative transverse movement therebetween, and an adjusting device disposed between said jaws including a base member having at least one tooth selectively engaged with the teeth on said master jaw and having a projection engaged within said longitudinal slot to fix said base member relative to said master jaw in selected position, said base member having a cam slot in one of its surfaces extending diagonally therein, said adjusting device also including another member slidably engaged within said transverse slot in said top jaw and having a projection on its outer face slidably engaged in said cam slot for movement therealong whereby to effect longitudinal adjustment of said top jaw relative to said master jaw, and a screw rotatably engaging one of said members and threaded to the other of said members to effect movement therebetween along said cam slot.

3. In a chuck, the combination comprising a master jaw having a longitudinally extending slot in its outer face and a plurality of transverse teeth adjacent said slot, a top jaw having a transverse slot and a longitudinally extending rib on its inner face which rib is engaged within said longitudinal slot to permit longitudinal adjustment between said jaws and to prevent relative transverse movement therebetween, and an adjusting device disposed between said jaws including a generally rectangular base member having at least one tooth on one of its surfaces selectively engaged with the teeth on said master jaw and having a projection on said one surface engaged within said longitudinal slot to fix said base member relative to said master jaw in selected position, said base member also having a diagonal cam slot in its surface opposite to said one surface, said adjusting device also including another generally rectangular member slidably engaged within said transverse slot and having a diagonal rib on its outer surface slidably engaged in said cam slot whereby movement of said other member in said transverse slot and along said cam slot effects longitudinal movement of said top jaw, and manually operable screw means rotatably engaging said other member and threaded to said base member for effecting movement of said other member within said transverse slot.

4. In a chuck, the combination comprising a master jaw having a longitudinally extending slot in its outer face and a plurality of transverse teeth adjacent said slot, a top jaw having a transverse slot and a longitudinally extending rib on its inner face which rib is engaged within said longitudinal slot to permit longitudinal adjustment between said jaws and to prevent relative transverse movement therebetween, and an adjusting device disposed between said jaws including a generally rectangular base member having a plurality of teeth on one of its surfaces selectively engaged with the teeth on said master jaw and having a projection on said one surface engaged within said longitudinal slot to fix said base member in selected position, said base member also having a diagonal cam slot in its surface opposite the said one surface, said adjusting device also including another generally rectangular member slidably enagged within said transverse slot and having a diagonal rib on its outer surface slidably engaged within said cam slot whereby movement of said other member in said transverse slot and along said cam slot effects longitudinal movement of said top jaw, a manually operable screw threaded to said base member and having a head rotatably engaging said other member for effecting movement of said other member within said transverse slot, and cooperating graduations on said head and said other member for indicating movement of the said top jaw responsive to rotation of said screw.

References Cited in the file of this patent

UNITED STATES PATENTS

| Number | Name | Date |
| --- | --- | --- |
| 1,869,631 | Swanson | Aug. 2, 1932 |
| 2,401,971 | Shuster | June 11, 1946 |
| 2,569,056 | Highberg | Sept. 25, 1951 |

FOREIGN PATENTS

| Number | Country | Date |
| --- | --- | --- |
| 627,395 | Great Britain | Aug. 8, 1949 |